United States Patent

[11] 3,544,708

[72] Inventor Mel E. Buechel
Chicago, Illinois 0
[21] Appl. No. 687,382
[22] Filed Dec. 1, 1967
[45] Patented Dec. 1, 1970
[73] Assignee Motorola, Inc.
Franklin Park, Illinois
a corporation of Illinois

[54] COLOR BURST SEPARATOR SYSTEM
10 Claims, 3 Drawing Figs.

[52] U.S. Cl. 178/5.4
[51] Int. Cl. H04n 9/46
[50] Field of Search 178/5.4, 5.4(C)(1), 5.4(Sync), 69.5(C.B.)

[56] References Cited
UNITED STATES PATENTS
3,024,305 3/1962 Wolfe 178/5.4

*Primary Examiner*—Richard Murray
*Assistant Examiner*—Robert L. Richardson
*Attorney*—Mueller, Aichele & Rauner

ABSTRACT: The system includes a gating circuit for translating the burst portion of the composite color signal. The gate pulse for the gating circuit is derived by utilizing both the horizontal synchronizing pulse which has a fixed time relationship with the burst, and the horizontal flyback pulse.

Inventor
MEL. E. BUECHEL
BY Mueller, Aichele & Rauner
ATTYS.

Inventor
MEL. E. BUECHEL

BY Mueller, Aichele & Rauner

ATTYS.

COLOR BURST SEPARATOR SYSTEM

BACKGROUND OF THE INVENTION

The standard composite color television signal includes video information composed of color components which are phase and amplitude modulated on a color subcarrier and brightness components. The composite signal also includes synchronizing pulses occurring during blanking intervals, and a burst signal in synchronized relationship with the subcarrier and also occurring during the blanking interval.

In a color television receiver, separate channels to the demodulator are provided for the brightness and color components. The burst signal is separated from the remainder of the composite signal to provide a reference signal of proper phase and frequency for synchronous demodulation of the modulated color components. By periodically keying an amplifier into conduction with gate pulses occurring during the blanking interval of the composite signal, the burst signal is translated to the exclusion of the remainder of the composite signal. These gate pulses in most present day receivers are the horizontal flyback pulses and are, therefore, susceptible to being displaced relative to the blanking interval by adjustment of, for example, the hold control in the horizontal deflection system. Since the flyback pulse occupies a substantial portion of the blanking interval, a given adjustment of the hold control may cause a portion of the flyback pulse to occur in time coincidence with some of the video information. In such case, the keyed amplifier will pass not only the burst signal but a portion of the video information to provide a reference signal which is of incorrect phase and/or amplitude to cause inaccurate demodulation and therefore inaccurate color reproduction.

Because the separated horizontal synchronizing pulse is always in a fixed time relationship with the burst signal independent of horizontal hold control, attempts have been made to use such pulse to key the burst separator amplifier into conduction. However, such operation has proved unsatisfactory because noise pulses occurring between synchronizing pulses would also gate the burst separator amplifier to cause noise to appear in the reference signal and thereby provide inaccurate color reproduction.

SUMMARY OF THE INVENTION

It is, therefore, a principle object of this invention to provide a burst signal separator circuit which is substantially unaffected by noise in the composite video signal and by adjustments in the horizontal deflection system.

In brief, a gate pulse producer is coupled to the synchronizing pulse separator circuit and to the horizontal deflection system so that the producer translates the separated synchronizing pulse in the presence of a flyback pulse generated by the deflection system. The output circuit in the gate pulse producer converts the translated synchronizing pulse into a gate pulse occurring in time coincidence with at least a portion of the burst signal in the composite signal. The composite signal is coupled to a gating circuit which is rendered conductive by the gate pulses from the gate pulse producer to pass substantially only the burst signal in the composite signal. Because the gate pulse producer is operative only during the presence of the flyback pulse, noise occurring during the transmission of video information is not reflected in the output circuit of the gate pulse producer. Because the time relationship between the burst signal and the gate pulse is fixed, adjustment of the hold control in the horizontal deflection system will not displace the gate pulse and therefore will not cause the burst signal separator to gate video information in addition to the burst signal.

DETAILED DESCRIPTION OF THE PREFERRED EMBODIMENTS

Figure 1:
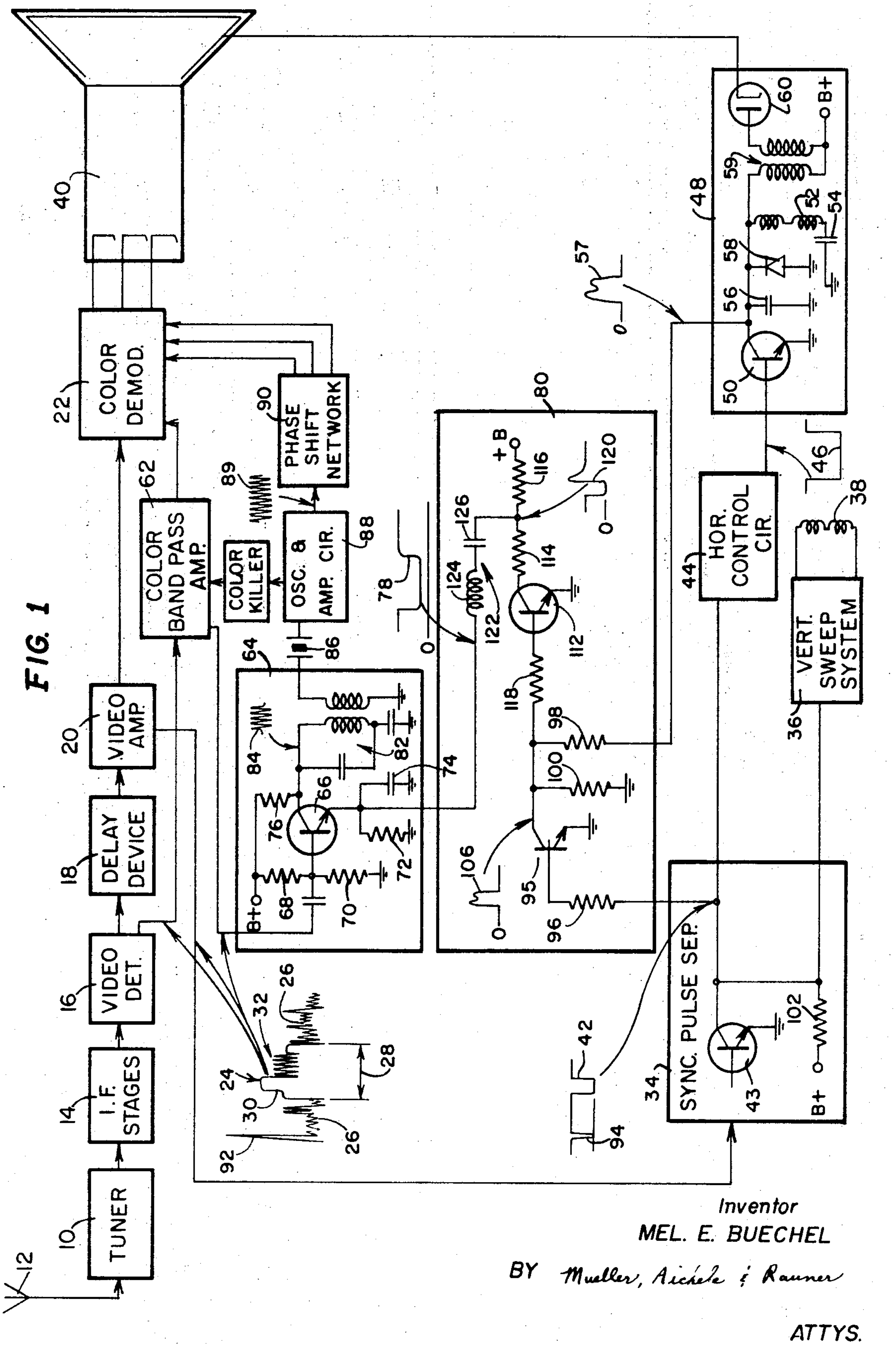
FIG. 1 illustrates a color television receiver partially in block and partially in schematic incorporating the features of one form of the invention.

Referring now to FIG. 1, the color television receiver therein shown includes a tuner 10 to receive and convert incoming television signals appearing at antenna 12. The tuner 10 may include, for example, RF stages of the receiver as well as the first detector or mixer and associated local oscillator. The output intermediate frequency signal developed by tuner 10 is coupled through intermediate frequency stages 14 to the video detector 16. The brightness components and synchronizing pulses in the detected composite video signal are delayed in a delay device 18 for purposes well known to those skilled in the art. The brightness components are amplified in video amplifier 20 and applied to the color demodulator 22.

The composite signal 24 provided by video amplifier 20 has video information components 26 with a blanking interval 28 recurring at the horizontal rate of 15,734 Hz. A horizontal synchronizing pulse 30 appears at the beginning of each blanking interval immediately followed by a burst signal component 32 for use as explained hereinafter. A vertical synchronizing pulse (not shown) appears in the composite video signal 24 at a 60 Hz. rate and is separated from the remainder of the composite signal in a synchronizing pulse separator circuit 34. The separated vertical synchronizing pulses are applied to the vertical sweep system 36 which develops a vertical sawtooth sweep signal in the vertical deflection winding 38 disposed on the neck of the cathode ray tube 40 for vertically deflecting the electron beams therein.

The horizontal synchronizing pulse 30 is separated from the remainder of the composite signal 24 in the synchronizing pulse separator circuit 34 to provide a separated horizontal synchronizing pulse 42 on the collector of the transistor 43. The synchronizing pulse 42 is applied to a horizontal control circuit 44 which develops a control pulse 46. The horizontal output circuit 48 includes a transistor 50 which is in saturation during the transmission of video information so that a linearly increasing current flows through the deflection winding 52 which is disposed on the cathode ray tube 40 for horizontally sweeping the electron beams therein. The negative-going control pulse 46 causes the transistor 50 to abruptly cut off and energy stored in the winding 52 is released and the current is permitted to oscillate for one-half cycle at a frequency determined by the inductance of 52 and 59 and the capacity of capacitors 54 and 56. The flyback pulse 57 thereby produced has a duration substantially encompassing the entire blanking interval 28 in order that the electron beams are returned to the left-hand side of the cathode ray tube screen within the allotted time for retrace. Ringing or continued oscillation is prevented by the damper diode 58. The third harmonic inserted in the flyback pulse 57 for purposes well known to those skilled in the art results in the peak of the pulse not being flat. The flyback pulse 57 is coupled through transformer 59 and rectified by diode 60 to provide high voltage for cathode ray tube 40.

The composite signal 24, for purposes here involved, is adequate to represent the composite signal applied from video detector 16 through the color band-pass amplifier 62 to the demodulator 22. A portion of the composite signal 24 derived from the color band-pass amplifier 62 is applied to a burst gate circuit 64. Circuit 64 includes an NPN transistor 66 having a quiescent voltage established on its base by the voltage divider consisting of resistors 68 and 70 from B+ to ground. The emitter of transistor 66 is coupled through a resistor 72 to ground and is bypassed at the frequency of the burst signal by capacitor 74. A d.c. collector load is provided by resistor 76 to B+. A gate pulse 78 from the gate pulse producer 80 to be explained hereinafter is applied to the emitter of transistor 66 during the blanking interval 28 of the composite signal 24. This renders the transistor 66 conductive only during such blanking interval so that only the burst signal component 32 will be translated into a resonant circuit 82 tuned to the frequency of the burst signal component to provide the separated burst signal 84. The burst signal 84 rings crystal 86 and is then applied to oscillator and amplifier circuit 88 which provides a continuous reference signal 89 at the frequency of the burst signal. The phase shifting network 90 develops reference signals each at a different preselected phase for application to the color demodulator 22. The brightness components from video amplifier 20, the color components from band-pass amplifier 62 and the three phase related reference signals from phase shifting network 90 combine in a particular fashion in color demodulator 22 to produce red, blue and green video voltage, which cause the multigun cathode ray tube 40 to produce a color image.

During monochrome transmission, it is desirable to disable the color channel so that noise and miscellaneous video signals cannot be coupled through the demodulator 22 to the cathode ray tube 40. This may be accomplished by coupling a portion of the separated burst signal appearing in oscillator and amplifier circuit 88 into a color killer circuit 91. In the absence of the burst signal indicating monochrome transmission, circuit 91 produces a control voltage for disabling color band-pass amplifier 62.

Figure 2:
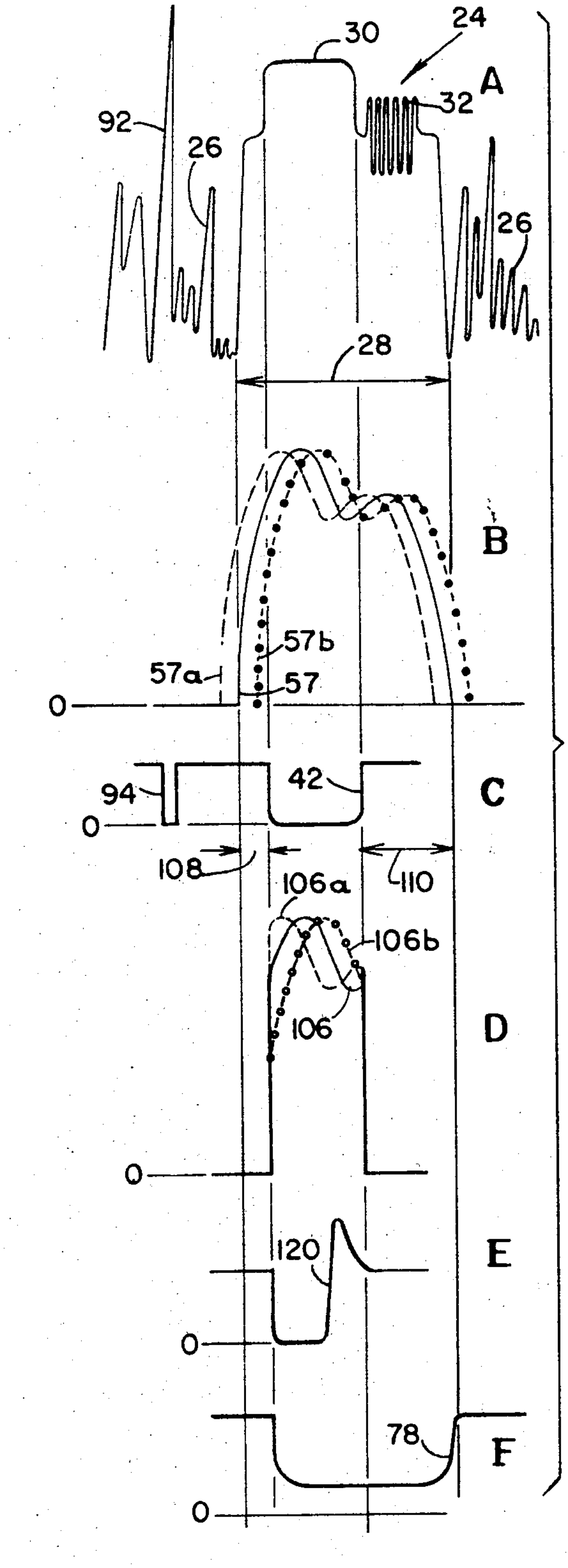
FIG. 2 illustrates a series of waveforms used for explaining the operation of the receiver of FIG. 1.

Referring now to FIG. 2, there is shown a series of signal one beneath the other in order to show correspondence in time. FIG. 2A illustrates the composite signal 24 on an enlarged scale. FIG. 2B illustrates the flyback pulse 57 and as shown encompasses substantially all of the blanking interval 28. In order to adjust the frequency of the sawtooth signal developed in the horizontal deflection winding 52, a consumer accessible hold control is provided in the horizontal control circuit 44. Adjusting the control to one extreme causes the flyback pulse 57 to be displaced relative to the blanking interval 28 to position **57*a*. The flyback pulse 57 will be in position 57*b* with the control adjusted to the opposite extreme. In the past, the flyback pulse 57 has been used as the gate pulse for the burst gating circuit 64 (of course, the polarity of the pulse would have to be reversed or it would have applied to a different electrode of the transistor 66, or a reverse polarity transistor would have to be used). As can be seen in FIGS. 2A and 2B, if the control is adjusted such that flyback pulse 57 is in position 57*a*, some of the video information 26 on the left-hand side of the blanking interval 28 will be gated into the resonant circuit 82, whereas if the flyback pulse is in position 57*b*, some of the video information 26 on the right side of the blanking interval 28 will be reflected in the resonant circuit 82. Video information can markedly change the frequency and phase of the reference signal 89 to provide incorrect demodulation in the color demodulator 22** and therefore inaccurate color reproduction.

In the past there have been attempts to use the separated synchronizing pulse 42 shown in FIG. 2C as the gating pulse for the burst gating circuit 64. These attempts, however, have not been successful because noise pulses 92 which periodically occur in the composite signal 24 during the video information transmission, are not distinguishable from the synchronizing pulse 30 so that, at the output of the synchronizing pulse separator circuit 34 would appear not only the separated synchronizing pulse 42 but also a noise pulse 94. The noise pulse would permit noise to be translated by the pulse gating circuit 64 into the resonant circuit 82 to again have an adverse effect on the reference signal 89.

To minimize the possibility of video information passing through the burst gating circuit 64, the gate pulse producer 80 is provided and includes a gate transistor 95 the emitter of which is grounded. The base of transistor 95 is coupled through resistor 96 to the collector of transistor 43 in synchronizing pulse separator circuit 34. The flyback pulse 57 from the horizontal output circuit 48 is coupled to the collector of the transistor 95 by a voltage divider comprising resistors 98 and 100. Transistor 95 is quiescently maintained in saturation by the current flowing from B+ through the resistor 102 in the synchronizing pulse separator circuit 34, and resistor 96. Therefore, the collector of transistor 95 is essentially at ground potential. When a negative-going horizontal synchronizing pulse 42 arrives at the base of transistor 95 to turn the same off, and a flyback pulse 57 from horizontal output circuit 48 arrives on the collector of transistor 95, the collector voltage will rise. After the synchronizing pulse 42 is gone, the collector of transistor 95 returns to ground potential in spite of the fact that the trailing portion of the flyback pulse 57 still exists in the horizontal output system 48. Accordingly, and as can be seen in FIGS. 2A and 2D, the pulse 106 produced by this operation will have the same duration as and occur in a fixed time relationship with the synchronizing pulse 30 in the composite signal 24. Although not apparent from the drawing, pulse 106 would be delayed slightly with respect to synchronizing pulse 30, but this delay is constant.

Now, if the noise pulse 92 appears during the transmission of the video information, and if such noise pulse is separated by the synchronizing pulse separator circuit 34 to produce a noise pulse 94, it will not be reflected on the collector of transistor 95 in the gate pulse producer 80. This is true because even though the negative pulse 94 unsaturates the transistor 95 there is no positive voltage on the collector to which an output pulse could arise. Rather, the collector is still at ground potential through resistor 100. Accordingly, noise pulses are not reflected on the emitter of the transistor 66 in the burst gate circuit 64 and extraneous noise will not appear in the resonant circuit 82. If, however, a noise pulse appears in the composite signal between the commencement of the flyback pulse 57 and the commencement of the synchronizing pulse 30 or between the completion of the synchronizing pulse and the termination of the flyback pulse as respectively indicated by the intervals 108 and 110 (FIG. 2C), such noise pulses will be reflected on the collector of transistor 95. This, however, does not have a particularly adverse effect because the duration of the interval 108 plus interval 110 is very short, on the order of 6 microseconds, compared to the entire horizontal interval of 63.5 microseconds.

As the hold control in the horizontal control circuit 44 is adjusted to change the position of the flyback pulse 57 relative to the blanking interval 28 (FIG. 2B), there is no effect on the location of the pulse 106 because the transistor 95 will become unsaturated only during the presence of the separated synchronizing pulse 42 which, of course, always appears in time coincidence with the synchronizing pulse 30 irrespective of adjustments in the hold control.

Referring to FIGS. 2B and 2D, pulse 106 on the collector of transistor 95 takes on the shape of the flyback pulse 57 so that adjustment of the hold control in the horizontal control circuit 44 to move the flyback pulse 57 to position **57*a* changes the shape of pulse 106 to that indicated by dashed line 106*a*. And if the hold control is adjusted to move flyback pulse 57 to position 57*b*, the pulse 106 will have the shape indicated by the dotted line 106*b***.

In order to minimize changes in the shape of pulse 106 with adjustments in the hold control and with different brightness settings, and an NPN limiter transistor 112 is provided in the gate pulse producer 80. Its emitter is grounded and its collector is coupled through a pair of resistors 114 and 116 to the B+ potential. The collector of transistor 95 is coupled through resistor 118 to the base of transistor 112. The transistor 112 acts to clip off the top of the pulse 106 so that it becomes essentially flat and also inverts it to provide the necessary polarity for the burst gate circuit 64 as indicated by waveform 120 (FIG. 2E). A pulse widening circuit 122 formed by the series combination of inductor 124 and d.c. blocking capacitor 126 causes the duration of the gate pulse 78 to encompass substantially the entire blanking interval 28 (FIG. 2F). The amount of pulse widening should be sufficient to permit at least portions of the gate pulse 78 and the burst signal component 32 of the composite signal 24 to be in time coincidence. Now, adjustment of the hold control in the horizontal control circuit 44 can have no effect on this time coincidence because, first, gate pulse 78 has a fixed duration and second, the leading edge of the gate pulse 78 is always substantially alined with the leading edge of the pulse component 30 of the composite signal 24.

In the presence of a weak incoming signal, the synchronizing pulse 30 is of insufficient amplitude to synchronize the control pulse 46 so that the picture produced by the cathode ray tube 40 will "roll" or "flop". In such condition, color is desirable not being produced. This is true because the synchronizing pulse 42 is either nonexistent or small in amplitude so as not to produce a gate pulse 78. No signal is, therefore, derived from the burst gate circuit 64 so that the control voltage produced by color killer circuit 91 maintains the color band-pass amplifier circuit 62 disabled.

Figure 3:
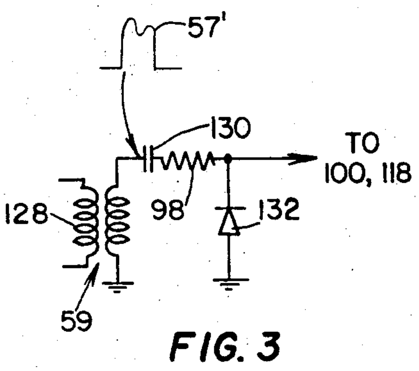
FIG. 3 illustrates another form of the invention.

Another form of the invention is illustrated in FIG. 3 where the transformer 59 in the horizontal output system 48 includes an additional winding 128 coupled through capacitor 130 to resistor 98 in pulse gate producer 80. This replaces the connection between the collector of the transistor 50 to resistor 98. A diode 132 is connected to ground to remove the negative portion of the flyback pulse 57' which would reverse bias transistor 95.

What has been described, therefore, is an improved burst signal separator circuit which has reduced susceptibility to noise appearing in the video information and reduced dependence on horizontal hold settings.

I claim:

1. In a television receiver for utilizing a composite signal comprising video frequency components, deflection synchronizing pulses, and a color reference burst signal, such receiver including a synchronizing pulse separator circuit and a cathode ray beam deflection system under control of the synchronizing pulses and developing a beam flyback pulse therein, a reference burst signal separation circuit, including in combination: a synchronizing pulse translation circuit coupled to the synchronizing pulse separator circuit and normally unresponsive to the synchronizing pulses therefrom; means applying the flyback pulses to said pulse translation circuit for rendering the same responsive to the synchronizing pulses to produce a gating pulse; a reference burst gate circuit including means coupling the composite signal thereto; and circuit means applying the gating pulse from said pulse translation circuit to said burst gate circuit to render said burst gate circuit operative in time coincidence with the burst signal for separating the burst signal from the composite signal.

2. The reference burst signal separation circuit set forth in claim 1 wherein said synchronizing pulse translation circuit includes a transistor normally biased into conduction and triggered into a cutoff condition in response to the synchronizing pulses.

3. The reference burst signal separation circuit set forth in claim 1, wherein said circuit means includes reactance means for lengthening the duration of the gating pulse produced by said synchronizing pulse translation circuit.

4. The reference burst signal separation circuit set forth in claim 1 wherein said circuit means includes a limiter device coupled to said synchronizing pulse translation circuit for producing a substantially constant amplitude gating pulse, and means coupling said limiter device to said burst gate circuit.

5. In a color television receiver for a composite signal comprised of horizontal synchronizing pulses and a burst signal component occurring during a blanking interval, and brightness and color information components and undesirable noise components occurring outside the blanking interval, a synchronizing pulse separator circuit for separating the synchronizing pulse from the remainder of the composite signal, a cathode ray tube, a horizontal deflection system for developing flyback pulses occurring during the blanking intervals and for deflecting electron beams in the cathode ray tube in response to the separated synchronizing pulses, the deflection system including a device for controlling the relationship in time between the flyback pulses and the blanking interval, a burst signal separator circuit including in combination: first gating means, a first output circuit coupled to said gating means, means coupling the synchronizing pulse separator circuit and the deflection system to said gating means for translating the synchronizing pulse to said output circuit in the presence of a flyback pulse and substantially excluding the noise components from said output circuit, said output circuit including circuit means for converting the translated synchronizing pulses into gate pulses occurring in time coincidence with at least a portion of the burst signal component, second gating means having a second output circuit, means coupling the composite signal to said second gating means and means coupling said first output circuit to said second gating means for rendering the same operative in the presence of the gate pulse to substantially pass only the burst signal component to said second output circuit and substantially excluding the brightness and color information components from said second output circuit irrespective of the setting of the device in the horizontal deflection system.

6. The burst signal separator circuit set forth in claim 5 wherein said first gating means comprises a transistor having input and output electrodes, with the synchronizing pulse separator circuit being coupled to said input electrode and with the horizontal deflection system coupled to said output electrode and with said output electrode coupled to said first output circuit.

7. The burst signal separator circuit set forth in claim 5 wherein said first output circuit includes a limiter transistor for producing a constant amplitude gate pulse and having an input electrode coupled to said first gating means and an output electrode coupled through said circuit means to said second gating means.

8. The burst signal separator circuit set forth in claim 5 wherein said circuit means includes reactance for lengthening the duration of the translated synchronizing pulses by an amount to cause the gate pulse to encompass a substantial portion of the synchronizing pulse and the burst signal component in the composite signal.

9. The burst signal separator circuit set forth in claim 5 wherein said first gating means comprises a first transistor having an emitter electrode coupled to a point of reference potential, a base electrode coupled to the synchronizing pulse separator circuit, and a collector electrode, a resistive voltage divider coupled between the horizontal deflection system and a point of reference potential, means coupling an intermediate point of said voltage divider to said collector electrode of said first transistor to provide a flyback pulse thereon, wherein said circuit means includes a second transistor for producing a constant amplitude gate pulse and having an emitter electrode coupled to said point of reference potential, a base electrode coupled to the collector electrode of said first transistor, and a collector electrode, wherein said circuit means further includes inductance means and capacitance means coupled in series between said collector electrode of said second transistor and said second gating means for lengthening the duration of the translated synchronizing pulses.

10. The burst signal separator circuit set forth in claim 5 wherein said first gating means comprises a transistor having input and output electrodes, bias means coupled to said input electrode for quiescently saturating said transistor, the separated synchronizing pulses being coupled to said input electrode, and having a polarity to cut off said transistor, and with the flyback pulses being coupled to said output electrode.